United States Patent Office 2,742,927
Patented Apr. 24, 1956

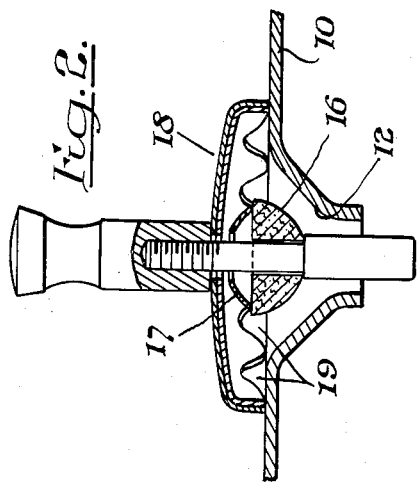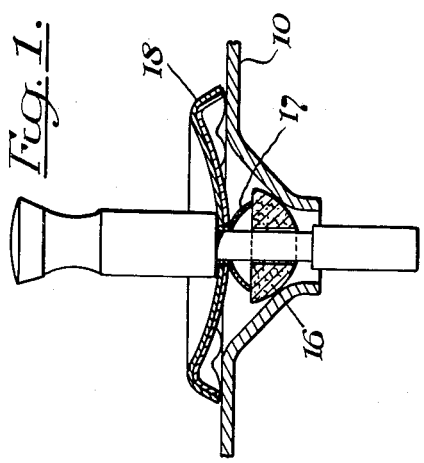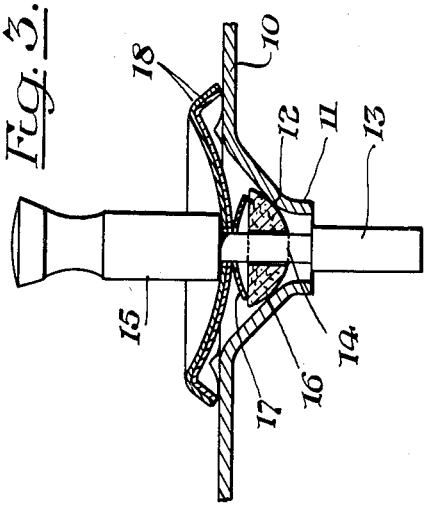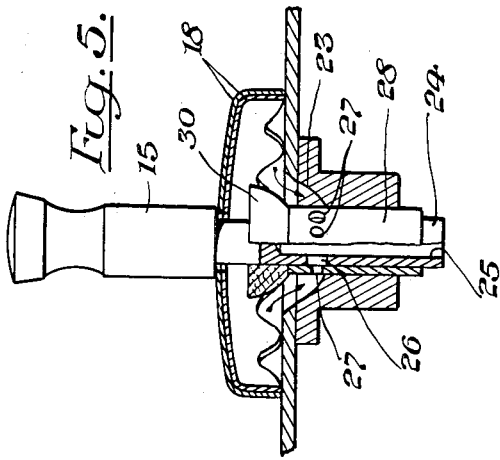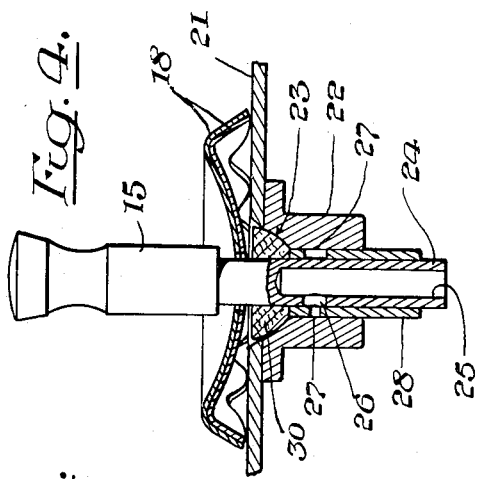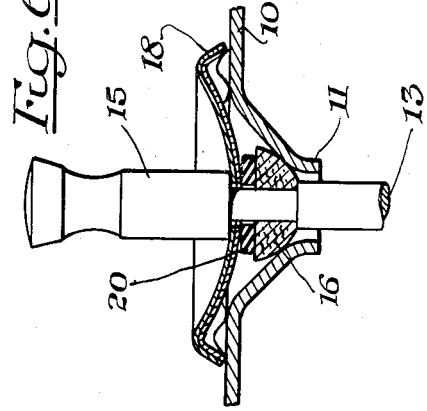

2,742,927

THERMOSTATIC VALVE

Charles J. Frumet, Jr., Cicero, Ill., assignor to U. S. Industries, Inc., a corporation of Delaware Application August 20, 1951, Serial No. 242,636

10 Claims. (Cl. 137—468)

This invention relates to a heat operated valve which is actuated upon the attainment of a predetermined temperature to open.

An object of this invention is to provide a heat actuated valve which is exceedingly simple in mechanical structure, capable of reliable operation, and inexpensive to manufacture.

Another object of this invention is to provide a valve adapted to be used under conditions where it is submerged in a liquid in a container, which liquid is to be released for discharge from the container when it is heated to a predetermined temperature. The valve is initially closed and the liquid is released by causing said valve to open. The initial closing may be either manual or automatic.

Another object of this invention is to provide in a valve of this type a construction wherein it may be easily reset to closed position.

Still another object of the invention is to provide in combination with such a valve, means for metering or controlling the rate of discharge of the heated liquid from its container to the point of use.

Other and more detailed objects of the invention will be apparent from the following description and the embodiment of the invention illustrated in the attached drawings.

In the drawings,

Figure 1 is a vertical, central, cross-sectional view through one form of valve in accordance with this invention shown in closed position;

Figure 2 is a similar valve shown open;

Figure 3 is a similar view showing an intermediate position of the parts while closing the valve;

Figure 4 is a vertical, central, cross-sectional view of a modified form of valve of this invention showing it closed;

Figure 5 shows this valve open; and

Figure 6 shows a similar view of a still further modified form of valve.

There are many uses for a simple and rugged heat actuated valve of the type which has but two positions, i. e. closed and open. The valve herein disclosed is of the type which is normally closed and when heated to a predetermined temperature opens to full open position. Among the uses, for example, to which a valve of this type may be put is for incorporation in a coffee maker of the drip type. This valve may be mounted in an opening in the bottom wall of a container in which the water for coffee making is to be heated. This container in turn is to be placed upon a container for the finished coffee with a perforated holder for the ground coffee interposed so that when the valve opens the water is discharged into the coffee at exactly the right temperature to produce a delectible brew. In either form the valve may be so constructed as to properly meter the rate of flow of water to the coffee so as to insure just the right extraction by leeching action.

Thus as illustrated in the drawings, the wall 10 of Figures 1 to 3 may be considered the bottom wall of a water container in which the water is to be heated in any suitable manner. In the form illustrated an aperture is provided in the bottom wall formed by shaping the metal thereof at the aperture into a spout 11 of generally frustro conical form in cross-section so as to provide a seat 12 of constricted area. A stem for the valve is provided consisting of a rod, for example, having portions 13 and 14 of successively smaller diameters so as to form an upwardly facing shoulder as clearly shown. The portion 14 of smaller diameter passes upwardly through a valve member 16, a cup shaped spring washer 17, the valve disc 18, and to the upper end of which is attached a handle 15. The valve 16 can be of any suitable material which will not be affected by fluids and particularly hot water, and yet will form a good sealing contact with the seat 12. The spring washer 17 can be of any suitable spring material which will provide the force required as set out later. The disc 18 is a thermostatic disc in that it is made up of two metals of different temperature coefficients united in face to face contact in accordance with well known practice, so as to form a dished structure which will change its shape when heated to a predetermined temperature. This cupped disc is provided with a downturned peripheral flange which is serrated or wave-like to provide a series of openings 19 between it and the wall 10.

If desired the peripheral edge of the flange could lie in one plane and the flange provided with a series of apertures.

This thermostatic element is freely mounted on the portion 14 of the stem. Figure 1 shows the valve in closed position. When this valve is immersed in water and the water is heated to the temperature for which the thermostatic disc is designed, its concave shape will change to a convex shape, as shown in Figure 2, with the result that the handle 15, the stem 13—14, the valve proper 16, and the spring washer 17 will be raised. Heated water in the container of which the wall forms the bottom, for example, will then trickle out through the opening 19 and through the down spout 11 to be discharged below the wall 10. In order to close this valve pressure is applied downwardly on the handle 15, causing the convex shape of the disc 18 to move back to concave form, as clearly shown in Figure 3. In order to insure that this deformation will be carried to the point where the disc will remain in concave shape, the dished spring washer 17 is provided which can be flattened out, as indicated in Figure 3, to permit sufficient overtravel of the center portion of the disc 18 so that it will remain in concave shape. When pressure is removed from the handle 15, it will spring back to its normal released concave shape, as indicated in Figure 1, at which time the dished spring washer 17 will return to its preformed condition and valve 16 will be seated.

The arrangement of Figures 4 and 5 is similar to that previously described, but a more finely metered control is provided, although, of course, the opening on the down spout 11 depending upon its size, will provide in many cases sufficient metering action. In the structure of Figures 4 and 5 the bottom wall of the container is indicated at 21 provided with an opening at which is secured, in any suitable manner, bushing 22, the passage of which is in alignment with the opening in the wall 21. Slidably mounted in the bushing is a sleeve 28 which has a series of apertures 27 positioned so as to be within the confines of the bushing when the valve is closed, as shown. Passing through the sleeve 28 is a valve stem 24 which is counterbored as indicated at 25 to a point so that the apertures 26 in the wall thus formed are aligned with the apertures 27. The upper portion of the stem is solid and has mounted thereon for movement therewith the valve proper 30. Mounted on the stem is the normally concave bi-metal disc 18 and, of course, the handle 15.

Figure 4 shows the valve closed. When it is heated by the fluid in which it is immersed, the disc 18 will spring to convex form, as shown, raising the handle 15, stem 24, the sleeve 28 and the valve 30 from its seat 23. The fluid will then flow up the serrated edge of the disc through the apertures 27 and 26 into the counterbore 25 and be discharged below the wall 21. The valve is closed as before by pressing on the handle 15. In this case there is provided no element corresponding to the spring washer 17 of the previous structure, but the parts are so designed that the disc may be sprung back to its normal concave shape. For this purpose the valve 30 may be sufficiently resilient so as to allow for required little overtravel in the structure to attain this result. When the valve is closed the apertures 26 and 27 are sealed off at the seat 23 so that the valve is closed.

The sleeve 28 is rotatably mounted on the stem 24 so that the position of its openings 27 with relation to the openings 26 in the stem can be finely adjusted to change the overall rate of flow of fluid through the valve. Thus, there is provided an adjustable metering mechanism of very simple form. The sleeve can have a tight enough friction fit so that this rotation can be effected and yet it will not slide easily on the valve stem. Of course, if desired a connection between them could be provided to prevent relative longitudinal movement while permitting rotational movement. It should be noted that the valve 30 in the case of this structure is not freely mounted on the valve stem as in the case of the structure of Figures 1 to 3 inclusive, but is fixed thereon at the top of the sleeve.

The structure of Figure 6 is generally similar to that of Figures 1 to 3 inclusive, the main difference being that instead of the spring washer 17 there is provided a relatively thick easily compressible washer 20 which will allow for sufficient overtravel of the stem when the valve is closed so as to insure deformation of the thermostatic disc 18 to normal concave shape.

It will be apparent from the above description that some changes could be made in the details of the structure employed to illustrate this invention. I do not, therefore, desire to be limited entirely by these details, but only as required by the appended claims.

What is claimed is:

1. A thermostatic valve for fluids comprising in combination, means forming an apertured seat, a valve for closing said aperture when resting on said seat, a cup-shaped bi-metal member having a perforate edge resting on said means, and a valve stem connecting said valve and cup-shaped bi-metal member, deformation of said cup-shaped bi-metal member at a predetermined temperature raising and retaining said valve from said seat, and the fluid passing through said aperture also passing through said perforate edge.

2. In the combination of claim 1, said valve stem having a handle attached thereto for returning said cup-shaped bi-metal member to normal shape after deformation and said valve to its seat.

3. In the combination of claim 1, said cup-shaped bi-metal member consisting of a flanged disc positioned so that its flange rests on said means, said flange being perforated.

4. In the combination of claim 1, said cup-shaped bi-metal member consisting of a flanged disc positioned so that its flange rests on said means, the flange on said disc having a notched edge to provide said perforate edge.

5. In the combination of claim 1, said valve stem having a pair of spaced shoulders, said valve and cup-shaped bi-metal member being freely slidable on the stem between said shoulders and a resilient member lying between said valve and cup-shaped bi-metal member.

6. In the combination of claim 1, said valve stem having a pair of spaced shoulders, said valve and cup-shaped bi-metal member being freely slidable on the stem between said shoulders, and a spring washer lying between said valve and cup-shaped bi-metal member.

7. In the combination of claim 1, said valve stem extending below said seat and having passages therein below said seat and an apertured sleeve mounted on said stem so that its apertures communicate with said passages.

8. In the combination of claim 1, said valve stem extending below said seat and having passages therein below said seat and an apertured sleeve mounted on said stem so that its apertures communicate with said passages, said sleeve being rotatable on the stem to provide an adjustable metering valve.

9. In the combination of claim 1, a handle attached to said valve stem forming a shoulder, said valve stem having a shoulder, and said cup-shaped bi-metal member and valve being slidably mounted on said stem between said shoulders.

10. In the combination of claim 1, a handle attached to said valve stem forming a shoulder, said valve stem having a shoulder, said cup-shaped bi-metal member and valve being slidably mounted on said stem between said shoulders, and a resilient washer lying between said cup-shaped bi-metal member and valve.

References Cited in the file of this patent

UNITED STATES PATENTS

| | | |
|---|---|---|
| 2,046,186 | Saul | June 30, 1936 |
| 2,118,299 | Ellis | May 24, 1938 |
| 2,292,853 | Wilcox | Aug. 11, 1942 |
| 2,498,386 | Alexander | Feb. 21, 1950 |